US012715030B2

(12) United States Patent
Fujii

(10) Patent No.: US 12,715,030 B2
(45) Date of Patent: Aug. 25, 2026

(54) METHOD OF MANUFACTURING FORMED PRODUCT

(71) Applicant: FUTABA INDUSTRIAL CO., LTD., Aichi (JP)

(72) Inventor: Sakura Fujii, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 18/911,930

(22) Filed: Oct. 10, 2024

(65) Prior Publication Data

US 2025/0128313 A1 Apr. 24, 2025

(30) Foreign Application Priority Data

Oct. 24, 2023 (JP) ................................ 2023-182364

(51) Int. Cl.
*B21D 39/02* (2006.01)
*B23K 20/02* (2006.01)

(52) U.S. Cl.
CPC ............. *B21D 39/02* (2013.01); *B23K 20/02* (2013.01)

(58) Field of Classification Search
None
See application file for complete search history.

(56) References Cited

U.S. PATENT DOCUMENTS 7,310,878 B2 * 12/2007 Chernoff ................ B62D 25/20 29/897
2019/0002030 A1 1/2019 Nishimura et al.
2021/0283715 A1 9/2021 Muto et al.
2023/0091150 A1 3/2023 Yasuda
2023/0138581 A1 5/2023 Ito

FOREIGN PATENT DOCUMENTS

CA 2876821 A1 * 2/2014 .......... B23K 11/166
DE 102008020757 A1 11/2008
DE 102014001872 A1 8/2015

(Continued)

OTHER PUBLICATIONS

Japanese Notice of Reasons for Refusal dated Jun. 24, 2025 for corresponding Japanese Application No. 2023-182364 filed Oct. 24, 2023.

(Continued)

*Primary Examiner* — Devang R Patel
(74) *Attorney, Agent, or Firm* — David D. Brush; Westman, Champlin & Koehler, P.A.

(57) ABSTRACT

A method of manufacturing a formed product includes placing and welding an inner metal plate on an outer metal plate to form at least one first joining portion, and then bending the outer and inner metal plates together by pressing. The pressing includes forming a first surface, at least one second surface extending in a direction crossing the first surface, and at least one bent portion coupling the first surface and the at least one second surface to each other and being layered on the inner metal plate, in the outer metal plate. The inner metal plate is welded on a region of the outer metal plate becoming the first surface via the at least one first joining portion. The inner metal plate is disposed on an inner side of the at least one bent portion, and its spring back is greater than that of the outer metal plate.

5 Claims, 7 Drawing Sheets

(56) References Cited

FOREIGN PATENT DOCUMENTS

| | | | | | |
|---|---|---|---|---|---|
| DE | 112016000550 | T5 | | 10/2017 | |
| DE | 112016006274 | T5 | | 10/2018 | |
| DE | 102021101617 | A1 | | 9/2021 | |
| DE | 102022122804 | A1 | | 3/2023 | |
| JP | 2000197969 | A | * | 7/2000 | |
| JP | 2008189985 | A | | 8/2008 | |
| JP | 2017177115 | A | * | 10/2017 | |
| JP | 2020131226 | A | | 8/2020 | |
| JP | 2024014376 | A | | 2/2024 | |
| KR | 20180114122 | A | * | 10/2018 | ......... B23K 26/0869 |
| WO | 2021187450 | A1 | | 9/2021 | |
| WO | 2025027958 | A1 | | 2/2025 | |

OTHER PUBLICATIONS

German Office Action dated May 26, 2026 for corresponding German Application No. 10 2024 130 650.5.

* cited by examiner

METHOD OF MANUFACTURING FORMED PRODUCT

CROSS-REFERENCE TO RELATED APPLICATIONS

This application claims the benefit of Japanese Patent Application No. 2023-182364 filed on Oct. 24, 2023 with the Japan Patent Office, the entire disclosure of which is incorporated herein by reference.

BACKGROUND

The present disclosure relates to a method of manufacturing a formed product.

In drawing or bending of a metal plate, a reinforcing plate (that is, patch) is placed and welded on a base material of the metal plate in order to enhance strength of the metal plate, and then pressing is performed. In such a processing, there occurs a difference in extension length caused by the pressing between the reinforcing plate disposed on an inner side of a bend and the base material disposed on an outer side of the bend. This results in generation of shear stress in a welded portion of the reinforcing plate, which increases a risk of cracking in the welded portion.

Japanese Unexamined Patent Application Publication No. 2020-131226 discloses a method of manufacturing a U-shaped formed product in which a main component member and a minor component member of the formed product are placed and welded on each other, and then pressed together. The U-shaped formed product comprises a top plate portion, two vertical wall portions, and bent portions each located between the top plate portion and a corresponding one of the two vertical wall portions. In the method, prior to the pressing, welded joining portions are provided in portions that correspond to the top plate portion and the two vertical wall portions. In order to disperse shear stress generated by pressing in the joining portion, two or more joining portions are provided in each of the portions that correspond to the two vertical wall portions so as to be aligned along a direction from a bent portion-side end of each of the two vertical wall portions toward its opposite-side end.

SUMMARY

However, in the aforementioned method of the Japanese Unexamined Patent Application Publication No. 2020-131226, depending on hardness of the members or types of pressing, especially in a case where high-tensile steel plate members are subjected to cold pressing, it is difficult to disperse shear stress generated in the joining portions, and stress relaxation tends to be insufficient. This results in a problem such that a risk of cracking in the joining portions increases.

In one aspect of the present disclosure, it is preferable to provide a method of manufacturing a formed product that allows reduction in cracking in a joining portion in two plate materials that are welded on each other.

One mode of the present disclosure is a method of manufacturing a formed product comprising placing and welding an inner metal plate on an outer metal plate to form at least one first joining portion. The method comprises bending the outer metal plate with the inner metal plate by pressing after the at least one first joining portion is formed. The pressing includes forming a first surface, at least one second surface, and at least one bent portion in the outer metal plate. The at least one second surface extends in a direction that crosses the first surface. The at least one bent portion couples the first surface and the at least one second surface to each other, and is layered on the inner metal plate. The at least one first joining portion is a portion where the inner metal plate is welded on a region of the outer metal plate that is to become the first surface. The inner metal plate is disposed on an inner side of the at least one bent portion, and spring back of the inner metal plate is larger than spring back of the outer metal plate.

Such a configuration allows reduction in stress concentration at the at least one first joining portion even in a case where the outer metal plate and the inner metal plate are bent together by pressing, which causes a difference in extension length between the outer metal plate and the inner metal plate. Therefore, it is possible to reduce cracking in the at least one first joining portion in the outer metal plate and the inner metal plate that are welded on each other.

In one mode of the present disclosure, tensile strength of the inner metal plate may be greater than that of the outer metal plate.

In such a configuration, spring back of the inner metal plate tends to be larger than that of the outer metal plate. This enables, after the pressing, the inner metal plate to be more easily pressed against the outer metal plate. Therefore, it is possible to facilitate close contact between the outer metal plate and the inner metal plate after the pressing.

In one mode of the present disclosure, the plate thickness of the inner metal plate may be thinner than that of the outer metal plate.

In such a configuration, spring back of the inner metal plate tends to be larger than that of the outer metal plate. This enables, after the pressing, the inner metal plate to be more easily pressed against the outer metal plate. Therefore, it is possible to facilitate close contact between the outer metal plate and the inner metal plate after the pressing.

In one mode of the present disclosure, the method may further comprise welding the outer metal plate and the inner metal plate on each other after the pressing to form at least one second joining portion. The at least one second joining portion is a portion where the inner metal plate is welded on the at least one second surface.

In such a configuration, the at least one second joining portion is formed in a condition less influenced by the difference in extension length caused by the pressing between the outer metal plate and the inner metal plate. Therefore, it is possible to reduce cracking in the at least one second joining portion. Moreover, the at least one second joining portion is formed in a condition where close contact between the outer metal plate and the inner metal plate is facilitated. This enables the at least one second joining portion to be formed easily.

In one mode of the present disclosure, a cross-sectional shape of the formed product may be a hat shape, a U-shape, or an L-shape. The cross-sectional shape is taken along a direction in which the first surface, the at least one bent portion and the at least one second surface are aligned. The inner metal plate is formed from a high tensile strength steel having a tensile strength of 590 MPa or greater.

Such a configuration enables, after the pressing, the inner metal plate to be more easily pressed against the outer metal plate. Therefore, it is possible to facilitate close contact between the outer metal plate and the inner metal plate after the pressing.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Configurations of Formed Product

Figure 1:
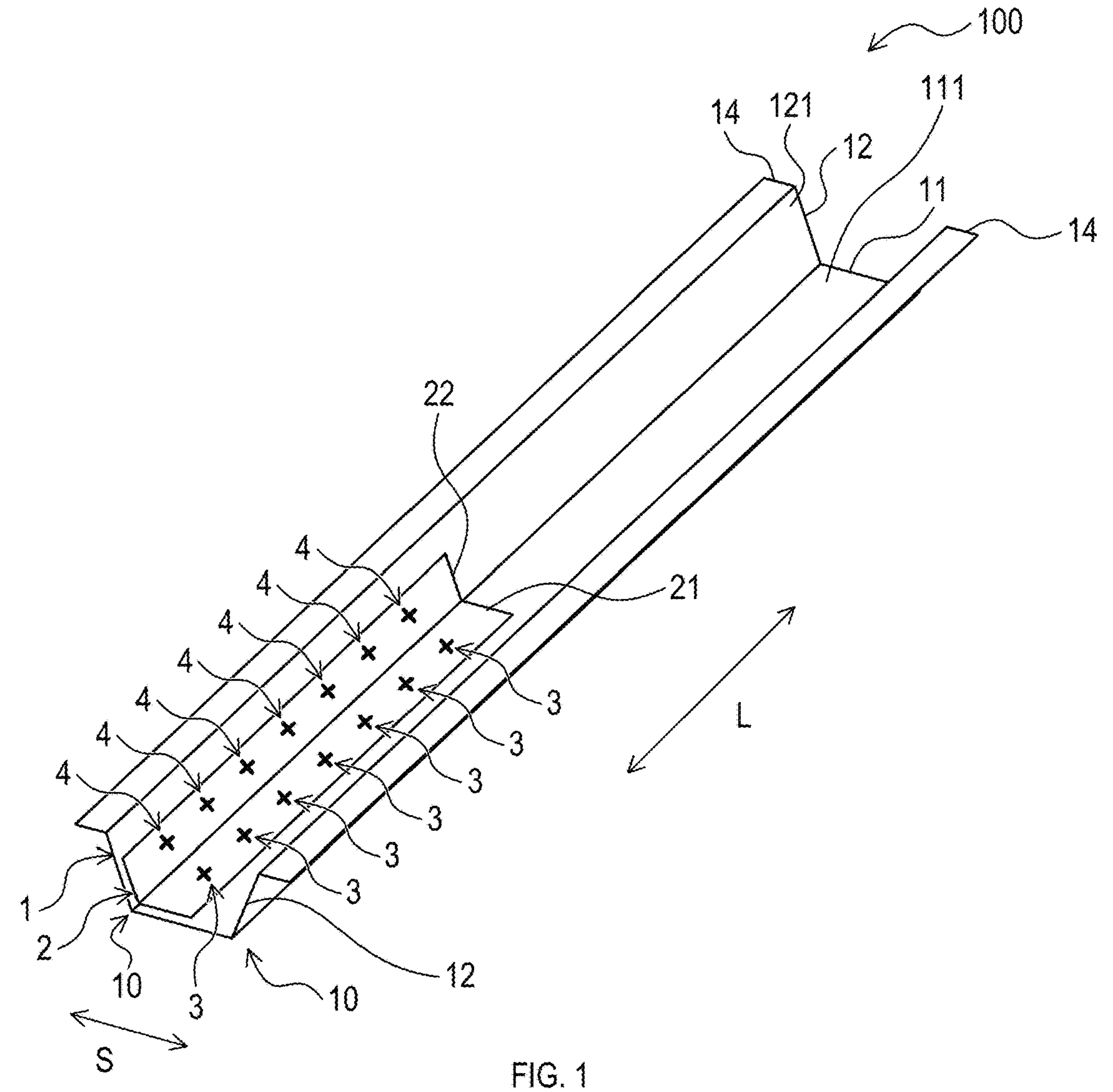
FIG. 1 is a schematic perspective view of a formed product.
Figure 2:
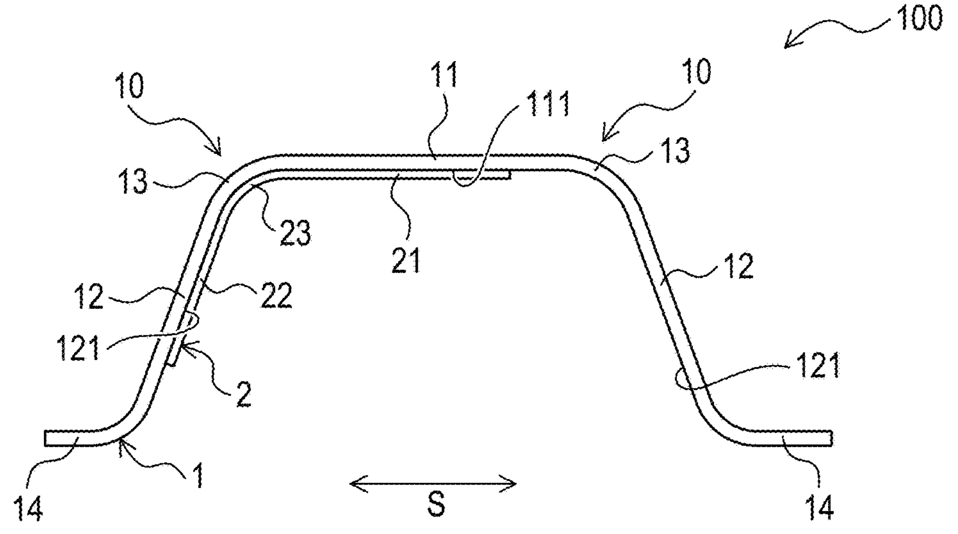
FIG. 2 is a schematic side view of the formed product.

A formed product 100 illustrated in FIGS. 1 and 2 is formed by subjecting a blank material to welding and press bending. The blank material is a plate material in which a first metal plate 1 and a second metal plate 2 are placed on each other (hereinafter, simply referred to as "blank material").

The formed product 100 is a plate-shaped component extending linearly along a longitudinal direction L of the formed product 100 and comprises two or more corner portions 10. Each of the two or more corner portions 10 is formed by pressing and drawing the blank material in a thickness direction of the blank material. In the present embodiment, a cross-sectional shape of the formed product 100 along a lateral direction S of the formed product 100 that is orthogonal to the longitudinal direction L (hereinafter, simply referred to as "cross-sectional shape") is a hat shape. The term "hat shape" as used herein indicates a shape that comprises two side walls facing each other, a ceiling wall, and two flange portions. Each of the two side walls includes a first end and a second end located opposite to the first end. The ceiling wall couples the first ends of the two side walls to each other. The two flange portions each extend from a different one of the second ends of the two side walls in directions opposite to each other.

The formed product 100 is used as, for example, a component part of a body of a vehicle. In the present embodiment, the formed product 100 is a rocker to be disposed at a lower portion of a lateral surface of a vehicle. The formed product 100 comprises a first metal plate 1, a second metal plate 2, two or more first joining portions 3, and two or more second joining portions 4.

<First Metal Plate>

The first metal plate 1 comprises, for example, a steel plate. In the present embodiment, a cross-sectional shape of the first metal plate 1 is a hat shape. The first metal plate 1 comprises a ceiling wall 11, two side walls 12, two bent portions 13, and two flange portions 14.

Plate surfaces of the ceiling wall 11 extend in a direction crossing plate surfaces of the two side walls 12 facing each other across a space. The ceiling wall 11 comprises a first surface 111. Each of the two side walls 12 comprises a second surface 121 that extends in a direction crossing the first surface 111. The first surface 111 is one of the plate surfaces of the ceiling wall 11 that is contiguous to the inner surfaces of the two bent portions 13 described later. The second surfaces 121 are the plate surfaces of the two side walls 12 that are contiguous to the inner surfaces of the two bent portions 13 described later.

Each of the two bent portions 13 is a portion of the first metal plate 1 between the ceiling wall 11 and one of the two side walls 12, and has been formed by subjecting the first metal plate 1 to bending. Each of the two bent portions 13 forms a corresponding one of the two or more corner portions 10 of the formed product 100. Each of the two bent portions 13 couples the first surface 111 of the ceiling wall 11 and the second surface 121 of a corresponding one of the two side walls 12.

Each of the two flange portions 14 is formed by subjecting the first metal plate 1 to bending, by which an end portion of a corresponding one of the two side walls 12 opposite to the ceiling wall 11 is bent. Plate surfaces of each of the two flange portions 14 extend in a direction that crosses the plate surfaces of the corresponding one of the side walls 12.

<Second Metal Plate>

Similar to the first metal plate 1, the second metal plate 2 comprises, for example, a steel plate. It should be noted that materials of the first metal plate and the second metal plate are not particularly limited. Moreover, materials of the first metal plate and the second metal plate may be different from each other. In the present embodiment, a cross-sectional shape of the second metal plate 2 is an L-shape.

The second metal plate 2 is placed and welded on the first metal plate 1. The second metal plate 2 is disposed across the ceiling wall 11, one of the two side walls 12, and one of the two bent portions 13 located between the ceiling wall 11 and the one of the two side walls 12 of the first metal plate 1. In the present embodiment, the second metal plate 2 is placed on the first surface 111 of the ceiling wall 11, one of the two second surfaces 121, and the inner surface of the one of the two bent portions 13 located between the first surface 111 and the second surface 121 of the first metal plate 1. That is, the second metal plate 2 is disposed on an inner side of the one of the two bent portions 13 of the first metal plate 1 and is welded on the first metal plate 1 so as to be layered from the inner side of the one of the two bent portions 13. In the present embodiment, the length of the second metal plate 2 in the longitudinal direction L is shorter than that of the first metal plate 1, and the second metal plate 2 is placed on only a part of a region of the first metal plate 1 along the longitudinal direction L. It should be noted that the length of the second metal plate in the longitudinal direction L may be substantially the same as that of the first metal plate, and the second metal plate may be placed on the entire region from one end to the other end of the first metal plate along the longitudinal direction L.

The second metal plate 2 comprises a first cover portion 21, a second cover portion 22, and a third cover portion 23.

The first cover portion 21 is a portion of the second metal plate 2 that is placed on the first surface 111 of the first metal plate 1.

The second cover portion 22 is a portion of the second metal plate 2 that is placed on the one of the two second surfaces 121 of the first metal plate 1.

The third cover portion 23 is a portion of the second metal plate 2 that is placed on the inner surface of the one of the two bent portions 13 of the first metal plate 1 and that couples the first cover portion 21 and the second cover portion 22 to each other. The third cover portion 23, together with the one of the two bent portions 13 of the first metal plate 1, forms one of the two or more corner portions 10 of the formed product 100.

In the present embodiment, the tensile strength of the second metal plate 2 is greater than that of the first metal plate 1, and the plate thickness of the second metal plate 2 is thinner than that of the first metal plate 1. In one example, the second metal plate 2 has a tensile strength of 1470 MPa and a plate thickness of 1.0 mm. In one example, the first metal plate 1 has a tensile strength of 270 MPa and a plate thickness of 2.6 mm. It should be noted that the tensile strength and the plate thickness of each of the first metal plate and the second metal plate are not limited to the aforementioned numerical values. The second metal plate 2 is preferably formed from a high tensile strength steel having a tensile strength of 590 MPa or greater, and is more preferably formed from a high tensile strength steel having a tensile strength of 980 MPa or greater.

As a tensile strength of a plate material increases, spring back after press bending of the plate material tends to be larger. Moreover, as a plate thickness of a plate material decreases, spring back after press being of the plate material tends to be larger. Therefore, in the present embodiment, spring back of the second metal plate 2 is larger than spring back of the first metal plate 1.

<First Joining Portions>

Figure 3A:
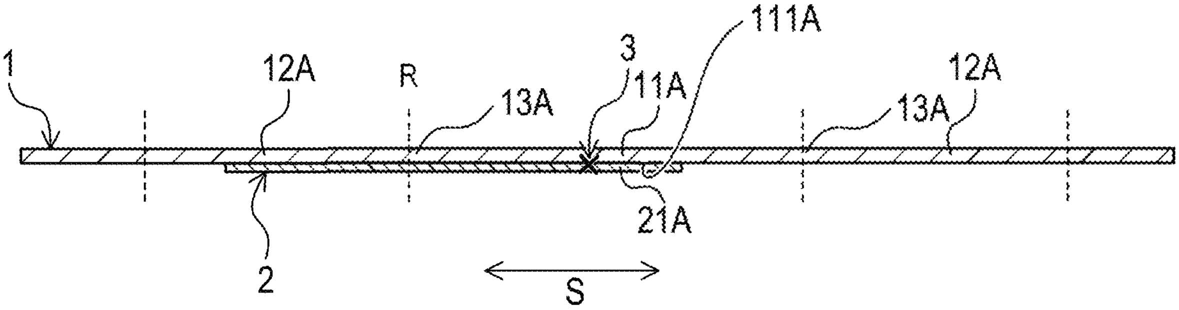
FIG. 3A is a schematic cross-sectional view of a blank material after a first welding process taken along a lateral direction of the blank material at a location of a first welding portion.

As illustrated in FIG. 1, two or more first joining portions 3 are provided. The two or more first joining portions 3 are portions of the formed product 100 where the first cover portion 21 of the second metal plate 2 is welded on the first surface 111 of the first metal plate 1. In the present embodiment, the two or more first joining portions 3 are formed prior to bending of the blank material, which will be described later in detail. Thus, as illustrated in FIG. 3A, the two or more first joining portions 3 are portions of the blank material where a portion 21A of the second metal plate 2 that is to become the first cover portion 21 is welded on a first region 111A of the first metal plate 1 that is to become the first surface 111. As illustrated in FIG. 1, the two or more first joining portions 3 are provided so as to be spaced apart from each other and to be aligned along the longitudinal direction L. The two or more first joining portions may be provided so as to be aligned along the lateral direction S.

<Second Joining Portions>

Two or more second joining portions 4 are provided. The two or more second joining portions 4 are portions of the formed product 100 where the second cover portion 22 of the second metal plate 2 is welded on the one of the two second surfaces 121 of the first metal plate 1. In the present embodiment, unlike the two or more first joining portions 3, the two or more second joining portions 4 are formed after bending of the blank material, which will be described later in detail. The two or more second joining portions 4 are provided so as to be spaced apart from each other and to be aligned along the longitudinal direction L. The two or more second joining portions may be provided so as to be aligned along the lateral direction S.

Each of the two or more first joining portions 3 and the two or more second joining portions 4 comprises, for example, a nugget formed at a welding point of spot-welding. Each of the joining portions may penetrate through the first metal plate 1 or the second metal plate 2.

2. Method of Manufacturing Formed Product

A method of manufacturing the aforementioned formed product 100 will be described hereinafter with reference to FIGS. 3A through 3C and 4. The method of manufacturing the formed product 100 comprises a first welding process S10, a bending process S20, and a second welding process S30.

<First Welding Process>

Firstly, as illustrated in FIG. 3A, the second metal plate 2 having a flat plate shape is placed and welded on the first metal plate 1 having a flat plate shape, by which the two or more first joining portions 3 are formed. Specifically, the second metal plate 2 is placed across a first portion 11A, which is to become the ceiling wall 11, a second portion 12A, which is to become the one of the two side walls 12, and a third portion 13A located between the first portion 11A and the second portion 12A, which is to become the one of the two bent portions 13, of the first metal plate 1 before bending. Then, the portion 21A of the second metal plate 2 before bending that is to become the first cover portion 21 is welded on the first region 111A of the first metal plate 1 before bending that is to become the first surface 111, for example, by spot-welding, by which the two or more first joining portions 3 are formed.

<Bending Process>

Figure 3B:
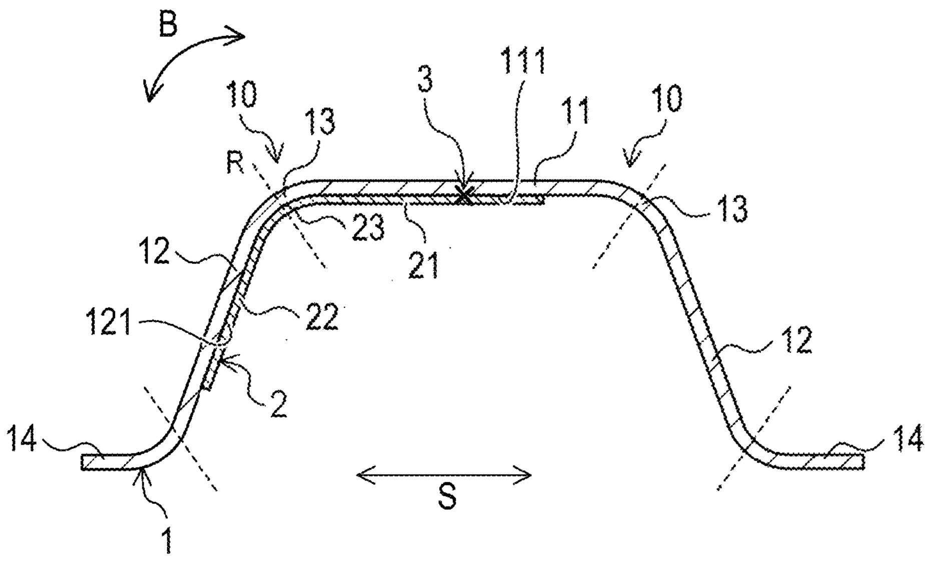
FIG. 3B is a schematic cross-sectional view of the blank material after a bending process taken along the lateral direction at a location of the first welding portion.

Secondly, as illustrated in FIG. 3B, after the two or more first joining portions 3 are formed as described above, the first metal plate 1 and the second metal plate 2 are bent together, by which the two or more corner portions 10 are formed. Specifically, the blank material after welding obtained after the first welding process S10 is subjected to cold pressing using a metallic mold (illustration omitted), by which the two or more corner portions 10 are formed.

As a result, the first metal plate 1 is drawn, and the ceiling wall 11 (that is, the first surface 111), the two side walls 12 (that is, the two second surfaces 121), and the two bent portions 13 and the two flange portions 14 are formed in the first metal plate 1.

In addition, the second metal plate 2 is bent along the ceiling wall 11, the two side walls 12, and the two bent portions 13, by which the first cover portion 21, the second cover portion 22, and the third cover portion 23 are formed in the second metal plate 2.

Thus, in the present embodiment, at the time when the blank material is subjected to bending, only a part of the plate surfaces of the first metal plate 1 located on a first side with respect to a ridge line R of the one of the two bent portions 13 of the first metal plate 1 to be formed by the bending (that is, the first surface 111) has been joined to the second metal plate 2 via the two or more first joining portions 3. On the other hand, a part of the plate surfaces of the first metal plate 1 located on a second side opposite to the first side with respect to the ridge line R of the one of the two bent portions 13 (that is, the second surface 121) has not been joined to the second metal plate 2.

<Second Welding Process>

Figure 3C:
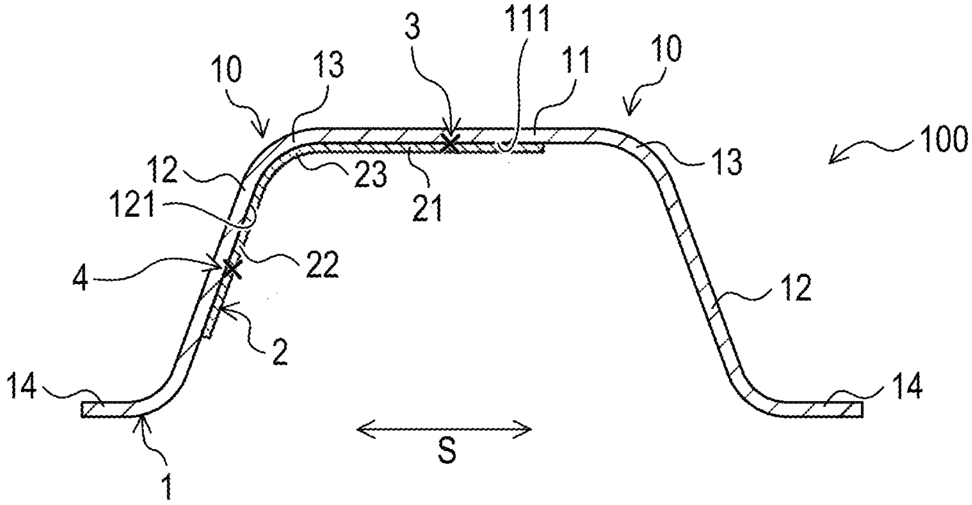
FIG. 3C is a schematic cross-sectional view of the formed product completed after a second welding process taken along a lateral direction of the formed product at a location of the first welding portion and a second welding portion.
Figure 4:
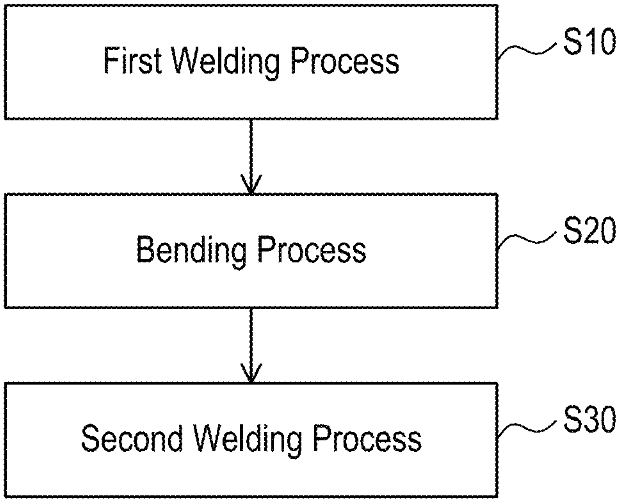
FIG. 4 is a flowchart showing a method of manufacturing the formed product.

Thirdly, as illustrated in FIG. 3C, after the aforementioned bending by cold pressing, the first metal plate 1 and the second metal plate 2 are further welded on each other, by which the two or more second joining portions 4 are formed. That is, the two or more second joining portions 4 are formed in the blank material after bending obtained through the bending process S20. Specifically, the second cover portion 22 of the second metal plate 2 after bending is welded on the second surface 121 of the first metal plate 1 after bending, for example, by spot-welding, by which the two or more second joining portions 4 are formed.

As described above, in the present embodiment, the formed product 100 can be obtained in a case where the first welding process S10, the bending process S20 and the second welding process S30 are performed in this order.

3. Effects

According to the embodiment explained above in detail, the following effects can be obtained.

(3a) In the present embodiment, at the time when the blank material is subjected to bending, only the first surface 111 located on the first side with respect to the ridge line R of the one of the two bent portions 13 of the first metal plate 1 to be formed by the bending has been joined to the second metal plate 2 via the two or more first joining portions 3. On the other hand, the second surface 121 located on the second side with respect to the ridge line R of the one of the two bent portions 13 has not been joined to the second metal plate 2.

This enables the second metal plate 2 to be less constrained by the second surface 121 of the first metal plate 1 even in a case where the first metal plate 1 and the second metal plate 2 are bent together by pressing, which causes a difference in extension length along bending directions B shown in FIG. 3B of the one of the two bent portions 13 between the first metal plate 1 and the second metal plate 2. This allows reduction in stress concentration at the two or more first joining portions 3. Therefore, it is possible to reduce cracking in the two or more first joining portions 3 in the first metal plate 1 and the second metal plate 2 that are welded on each other.

(3b) In the present embodiment, the tensile strength of the second metal plate 2 located on the inner side of the one of the two bent portions 13 of the first metal plate 1 is greater than that of the first metal plate 1, and the plate thickness of the second metal plate 2 is thinner than that of the first metal plate 1. Thus, spring back after press bending of the second metal plate 2 tends to be larger than that of the first metal plate 1. This enables, after bending, the second metal plate 2 to be more easily pressed against the first metal plate 1. Therefore, it is possible to facilitate close contact between the first metal plate 1 and the second metal plate 2 after bending. That is, it is possible, in the blank material after bending, to reduce separation of the second metal plate 2 from the second surface 121 of the first metal plate 1 even in a case where the second metal plate 2 is not joined to the second surface 121 of the first metal plate 1 as in the present embodiment.

(3c) In the present embodiment, the two or more second joining portions 4 are formed after bending. This enables the two or more second joining portions 4 to be formed in a condition less influenced by the difference in extension length along the bending directions B between the first metal plate 1 and the second metal plate 2 caused by bending. Therefore, it is possible to reduce cracking in the two or more second joining portions 4.

In the present embodiment, spring back of the second metal plate 2 is configured to be larger than spring back of first metal plate 1, by which the two or more second joining portions 4 are formed in a condition where close contact between the first metal plate 1 and the second metal plate 2 is facilitated. This enables the two or more second joining portions 4 to be formed easily.

In the present embodiment, the first metal plate 1 corresponds to one example of an outer metal plate, and the second metal plate 2 corresponds to one example of an inner metal plate. The first surface 111 of the ceiling wall 11 corresponds to one example of a first surface, the second surface 121 of each of the two side walls 12 corresponds to one example of a second surface, and the first region 111A of the first metal plate 1 corresponds to one example of a region of the outer metal plate that is to become the first surface.

4. Other Embodiments

Although the embodiment of the present disclosure has been explained, the present disclosure is not limited to the aforementioned embodiment and may be practiced in various other forms.

(4a) In the aforementioned embodiment, in the first welding process, the portion 21A of the second metal plate 2 before bending that is to become the first cover portion 21 is welded on the first region 111A of the first metal plate 1 before bending that is to become the first surface 111, by which the two or more first joining portions 3 are formed. Then, in the second welding process, the second cover portion 22 of the second metal plate 2 after bending is welded on the second surface 121 of the first metal plate 1 after bending, by which the two or more second joining portions 4 are formed. However, joining portions formed in the first welding process and in the second welding process are not limited thereto.

Figure 5A:
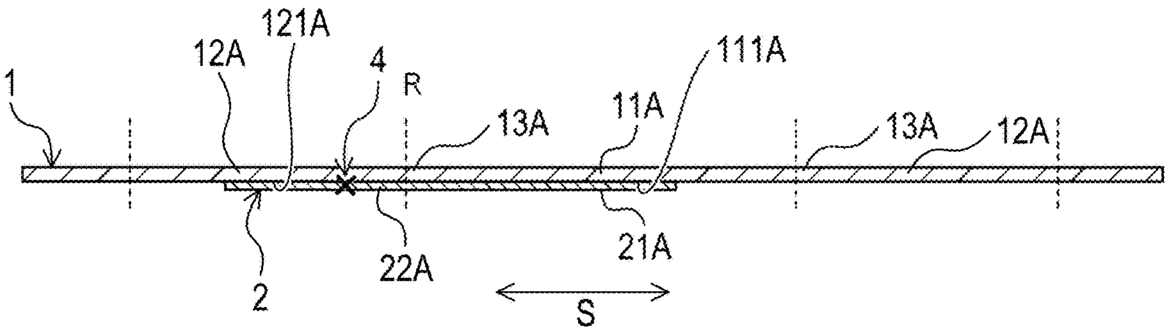
FIG. 5A is a schematic cross-sectional view of a blank material after a first welding process of a first modified example of the method taken along a lateral direction of the blank material at a location of a second welding portion.
Figure 5B:
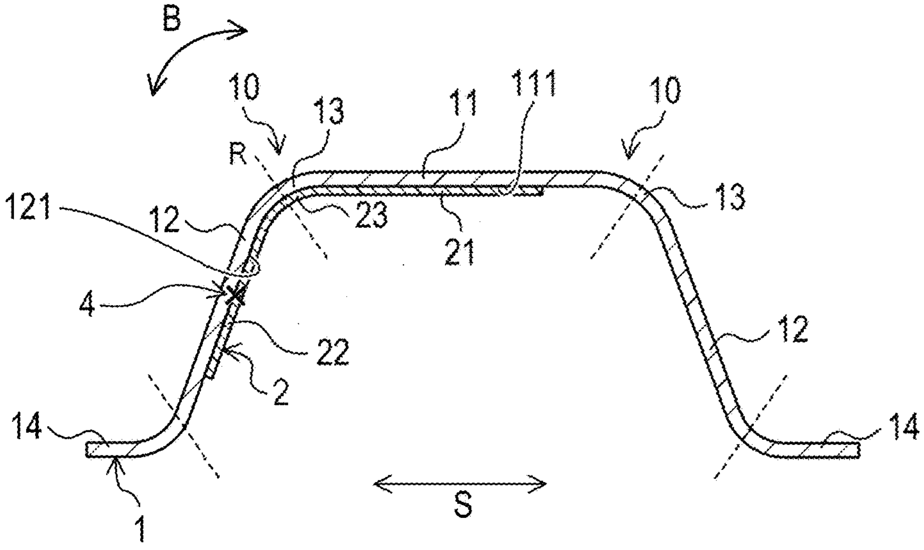
FIG. 5B is a schematic cross-sectional view of the blank material after a bending process of the first modified example of the method taken along the lateral direction at a location of the second welding portion.
Figure 5C:
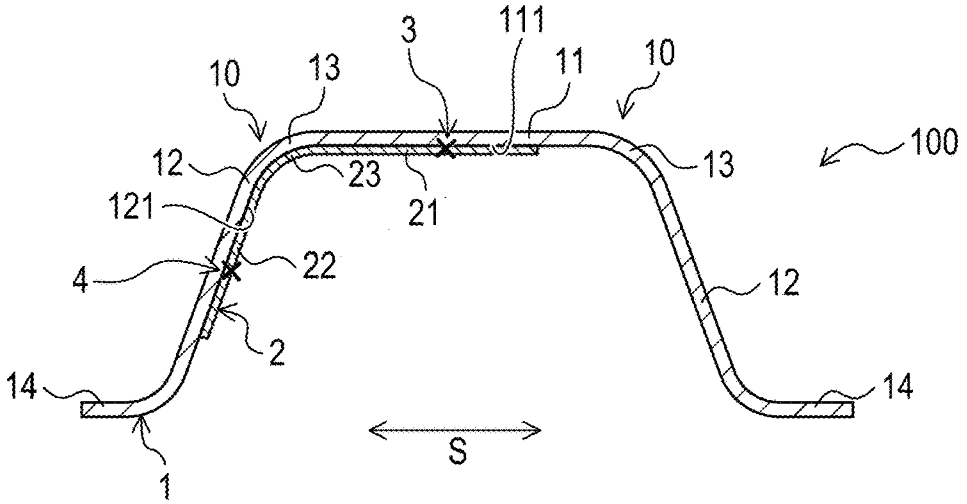
FIG. 5C is a schematic cross-sectional view of a formed product completed after a second welding process of the first modified example of the method taken along a lateral direction of the formed product at a location of a first welding portion and the second welding portion.

For example, the formed product 100 may be manufactured by a first modified example of the method illustrated in FIGS. 5A to 5C.

<First Welding Process>

Firstly, as illustrated in FIG. 5A, the second metal plate 2 is placed across the first portion 11A, which is to become the ceiling wall 11, the second portion 12A, which is to become the one of the two side walls 12, and the third portion 13A located between the first portion 11A and the second portion 12A, which is to become the one of the two bent portions 13, of the first metal plate 1 before bending. Then, a portion 22A of the second metal plate 2 before bending that is to become the second cover portion 22 is welded on a second region 121A of the first metal plate 1 before bending that is to become the second surface 121, by which the two or more second joining portions 4 are formed.

<Bending Process>

Secondly, as illustrated in FIG. 5B, after the two or more second joining portions 4 are formed as described above, the first metal plate 1 and the second metal plate 2 are bent together by cold pressing, by which the two or more corner portions 10 are formed. The bending process in the first modified example of the method is the same as that of the method in the aforementioned embodiment, and thus a detailed explanation will be omitted.

Thus, in the first modified example of the method, at the time when the blank material is subjected to bending, only the second surface 121 located on the second side with respect to the ridge line R of the one of the two bent portions 13 of the first metal plate 1 to be formed by the bending is joined to the second metal plate 2 via the two or more second joining portions 4. On the other hand, the first surface 111 located on the first side with respect to the ridge line R of the one of the two bent portions 13 has not been joined to the second metal plate 2.

<Second Welding Process>

Thirdly, as illustrated in FIG. 5C, the two or more first joining portions 3 are formed in the blank material after the aforementioned bending by cold pressing. Specifically, the first cover portion 21 of the second metal plate 2 after bending is welded on the first surfaces 111 of the first metal plate 1 after bending, by which the two or more first joining portions 3 are formed. The formed product 100 obtained by the first modified example of the method has the same effects as those of (3a) to (3c) of the aforementioned embodiment.

(4b) In the aforementioned embodiment, the formed product 100 has been exemplified in which a cross-sectional shape of the first metal plate 1 is a hat shape, and a cross-sectional shape of the second metal plate 2 is an L-shape. However, a cross-sectional shape of each of the first metal plate 1 and the second metal plate 2 in the formed product is not limited thereto. For example, a cross-sectional shape of each of the first metal plate 1 and the second metal plate 2 may be a hat shape, a U-shape, or an L-shape. Moreover, for example, a cross-sectional shape of the first metal plate 1 may be the same as or different from a cross-sectional shape of the second metal plate 2.

Figure 6:
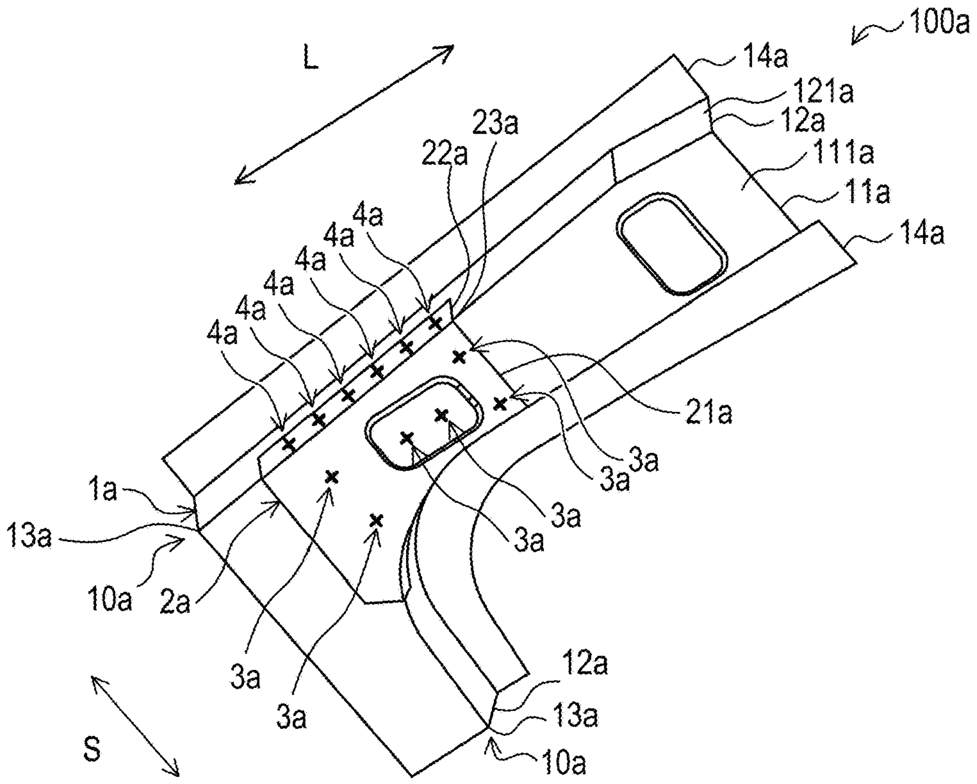
FIG. 6 is a schematic perspective view of a formed product of a second modified example.
Figure 7:
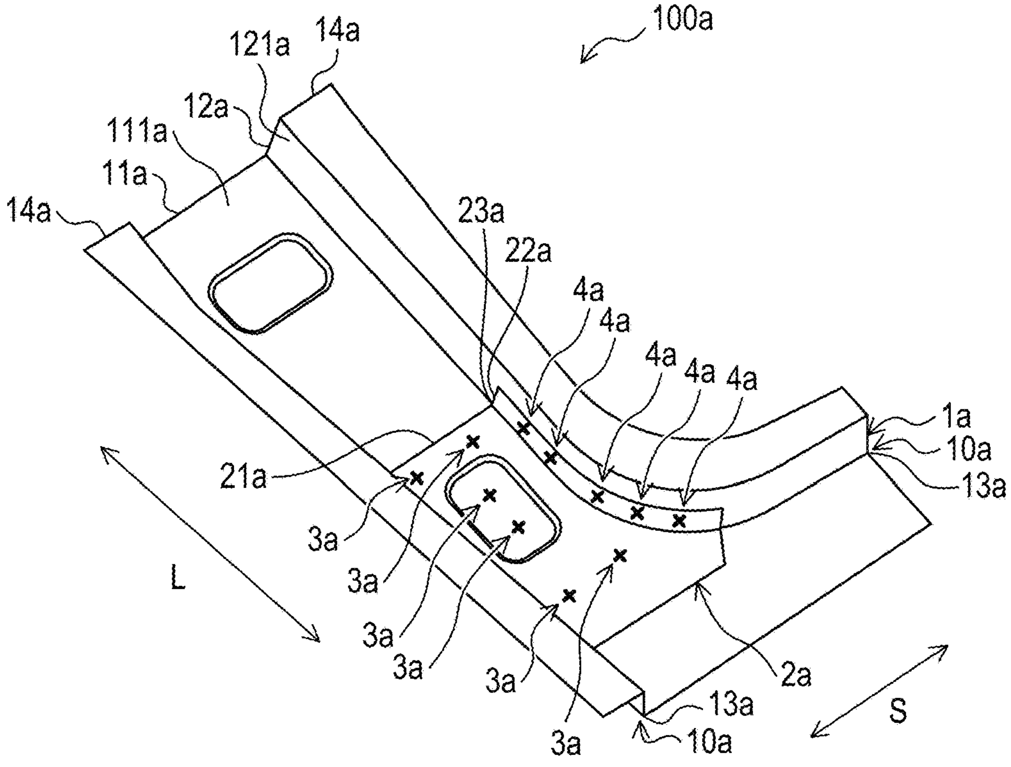
FIG. 7 is a perspective view of the formed product of the second modified example of FIG. 6 as viewed from another direction.

For example, as a formed product 100*a* of a second modified example illustrated in FIGS. 6 and 7, a cross-sectional shape of the first metal plate 1*a* may be a hat shape, and a cross-sectional shape of the second metal plate 2*a* may be a U-shape. The formed product 100*a* is an L-shaped and plate-shaped component that extends in a longitudinal direction L of the formed product 100*a*, and that one end of the formed product 100*a* along the longitudinal direction L extends in a lateral direction S of the formed product 100*a*. Similar to the aforementioned embodiment, the formed product 100*a* comprises two or more corner portions 10*a*. The formed product 100*a* is, for example, a front pillar to be disposed at a front lower portion of a lateral surface of a vehicle. The formed product 100*a* comprises a first metal plate 1*a*, a second metal plate 2*a*, two or more first joining portions 3*a*, and two or more second joining portions 4*a*. The materials, the tensile strength, the plate thickness and the like of the first metal plate 1*a* and the second metal plate 2*a* are similar to those of the first metal plate 1 and the second metal plate 2 of the aforementioned embodiment, and thus a detailed explanation will be omitted.

<First Metal Plate>

The first metal plate 1*a* comprises a ceiling wall 11*a*, two side walls 12*a*, two bent portions 13*a*, and two flange portions 14*a*. The configurations of the ceiling wall 11*a*, the two side walls 12*a*, the two bent portions 13*a*, and the two flange portions 14*a* are respectively similar to the ceiling wall 11, two side walls 12, two bent portions 13, and two flange portions 14 of the aforementioned embodiment, and thus a detailed explanation will be omitted.

<Second Metal Plate>

The second metal plate 2*a* is disposed across the ceiling wall 11*a*, the two side walls 12*a*, and the two bent portions 13*a* of the first metal plate 1*a*. In the formed product 100*a*, the second metal plate 2*a* is placed on a first surface 111*a* of the ceiling wall 11*a*, two second surfaces 121*a* of the two side walls 12*a*, and inner surfaces of the two bent portions 13*a* of the first metal plate 1*a*.

The second metal plate 2*a* comprises a first cover portion 21*a*, two second cover portions 22*a*, and two third cover portions 23*a*. The configurations of the first cover portion 21*a*, each of the two second cover portions 22*a*, and each of the two third cover portions 23*a* are respectively similar to the first cover portion 21, the second cover portion 22, and the third cover portion 23 of the aforementioned embodiment, and thus a detailed explanation will be omitted.

<First Joining Portions>

The two or more first joining portions 3*a* are portions of the formed product 100*a* where the first cover portion 21*a* of the second metal plate 2*a* is welded on the first surface 111*a* of the first metal plate 1*a*. The two or more first joining portions 3*a* are provided so as to be spaced apart from each other and to be aligned along the longitudinal direction L and the lateral direction S.

<Second Joining Portions>

The two or more second joining portions 4*a* are portions of the formed product 100*a* where each of the two second cover portions 22*a* of the second metal plate 2*a* is welded on a corresponding one of the two second surface 121*a* of the first metal plate 1*a*. The two or more second joining portions 4 are provided so as to be spaced apart from each other and to be aligned along the longitudinal direction L.

The aforementioned formed product 100*a* is manufactured by a method described below. In the method of manufacturing the formed product 100*a* of the second modified example, firstly, in a first welding process, the second metal plate 2*a* is placed across portions of the first metal plate 1*a* before bending that are to become the ceiling wall 11*a*, the two side walls 12*a*, and the two bent portions 13*a*. Then, a portion of the second metal plate 2*a* before bending that is to become the first cover portion 21*a* is welded on a region of the first metal plate 1*a* before bending that is to become the first surfaces 111*a*, by which the two or more first joining portions 3*a* are formed.

Secondly, in a bending process, after the two or more first joining portions 3*a* are formed, the first metal plate 1*a* and the second metal plate 2*a* are bent together by cold pressing, by which the two or more corner portions 10*a* are formed. That is, the first metal plate 1*a* and the second metal plate 2*a* are bent so that a cross-sectional shape of the first metal plate 1*a* is a hat shape, and that a cross-sectional shape of the second metal plate 2*a* is a U-shape.

Thirdly, in a second welding process, the two or more second joining portions 4*a* are formed in the blank material after the aforementioned bending by cold pressing. Specifically, each of the two second cover portions 22*a* of the second metal plate 2*a* after bending is welded to a corresponding one of the two second surfaces 121*a* of the first metal plate 1*a* after bending, by which the two or more second joining portions 4 are formed. The formed product 100*a* obtained by the method also has the same effects as those of (3a) to (3c) of the aforementioned embodiment.

It should be noted that, in the formed product 100*a*, in the first welding process, firstly, only one of portions of the second metal plate 2*a* before bending that are to become the two second cover portions 22*a* may be welded on a corresponding one of regions of the first metal plate 1*a* before bending that are to become the two second surfaces 121*a*, by which the two or more second joining portions 4 are formed. After that, the bending process is carried out, and then, in the second welding process, one of the two second cover portions 22*a* of the second metal plate 2*a* after bending that has not been joined may be welded on a corresponding one of the two second surfaces 121*a* of the first metal plate 1*a* after bending, by which the two or more second joining portions 4*a* are formed. Additionally, in the second welding process, the first cover portion 21*a* of the second metal plate 2*a* after bending may be welded to the first surfaces 111*a* of the first metal plate 1*a* after bending, by which the two or more first joining portions 3*a* are formed. The formed product 100*a* obtained by the method also has the same effects as those of (3a) to (3c) of the aforementioned embodiment.

Figure 8:
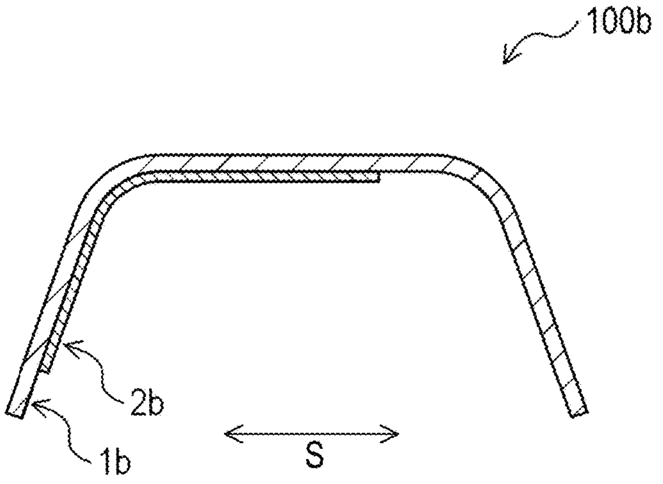
FIG. 8 is a schematic cross-sectional view of a formed product of a third modified example taken along a lateral direction of the formed product.

Moreover, for example, as a formed product 100*b* of the third modified example illustrated in FIG. 8, a cross-sectional shape of a first metal plate 1*b* may be a U-shape, and a cross-sectional shape of a second metal plate 2*b* may be an L-shape.

Figure 9:
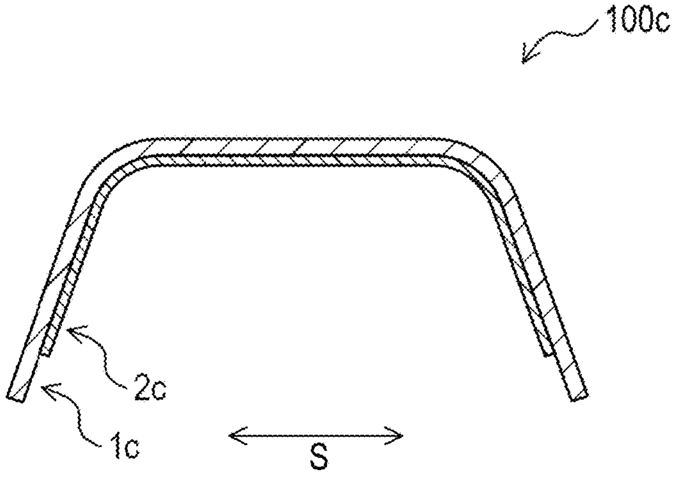
FIG. 9 is a schematic cross-sectional view of a formed product of a fourth modified example taken along a lateral direction of the formed product.

Furthermore, for example, as a formed product 100*c* of the fourth modified example illustrated in FIG. 9, a cross-sectional shape of a first metal plate 1*c* may be a U-shape, and a cross-sectional shape of a second metal plate 2*c* may be a U-shape.

Figure 10:
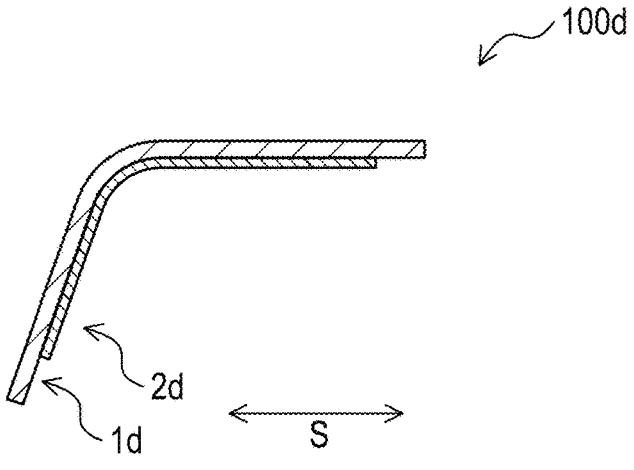
FIG. 10 is a schematic cross-sectional view of a formed product of a fifth modified example taken along a lateral direction of the formed product.

Furthermore, for example, as a formed product 100*d* of the fifth modified example illustrated in FIG. 10, a cross-sectional shape of a first metal plate 1*d* may be an L-shape, and a cross-sectional shape of a second metal plate 2*d* may be an L-shape.

Figure 11:
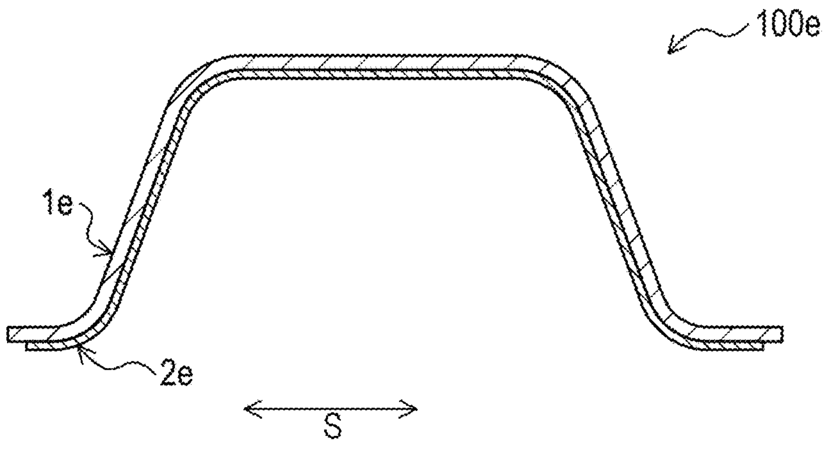
FIG. 11 is a schematic cross-sectional view of a formed product of a sixth modified example taken along a lateral direction of the formed product.

Furthermore, for example, as a formed product 100*e* of the sixth modified example illustrated in FIG. 11, a cross-sectional shape of a first metal plate 1*e* may be a hat shape, and a cross-sectional shape of a second metal plate 2*e* may be a hat shape.

(4c) In the aforementioned embodiment, the second metal plate 2 is disposed on the inner side of the one of the two bent portions 13 of the first metal plate 1, and is welded on the first metal plate 1 so as to be layered from the inner side of the one of the two bent portions 13.

Figure 12:
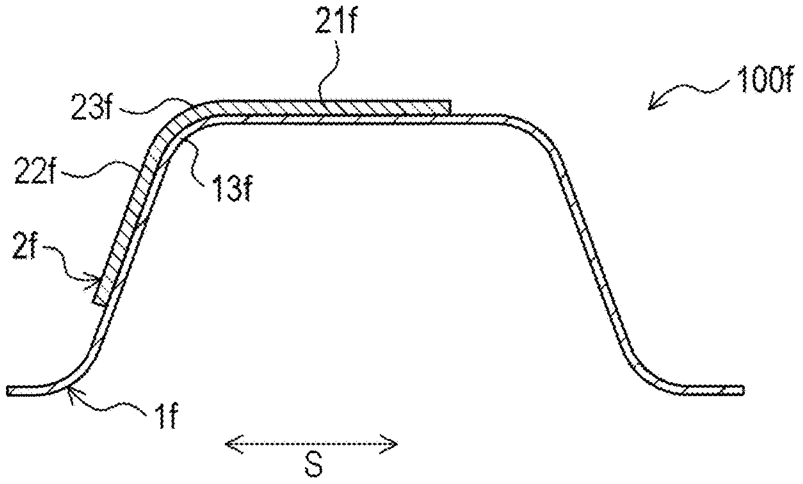
FIG. 12 is a schematic cross-sectional view of a formed product of a seventh modified example taken along a lateral direction of the formed product.

However, for example, as a formed product 100*f* of the seventh modified example illustrated in FIG. 12, a second metal plate 2*f* may be disposed on an outer side of one of two bent portions 13*f* of a first metal plate 1*f*, and may be welded on the first metal plate 1*f* so as to be layered from the outer side of the one of the two bent portions 13*f*. That is, the second metal plate 2*f* may be placed on an outer surface of the one of two bent portions 13*f*. A cross-sectional shape of the first metal plate 1*f* is a hat shape, and a cross-sectional shape of the second metal plate 2*f* is an L-shape. In the formed product 100*f* illustrated in FIG. 12, the first metal plate 1*f* corresponds to one example of the inner metal plate, and the second metal plate 2*f* corresponds to one example of the outer metal plate. An inner surface of a first cover portion 21*f* corresponds to one example of the first surface, an inner surface of a second cover portion 22*f* corresponds to one example of the second surface, a third cover portion 23*f* corresponds to one example of a bent portion, and a region of the second metal plate 2*f* that is to become the inner surface of the first cover portion 21*f* corresponds to one example of the region of the outer metal plate that is to become the first surface.

Figure 13:
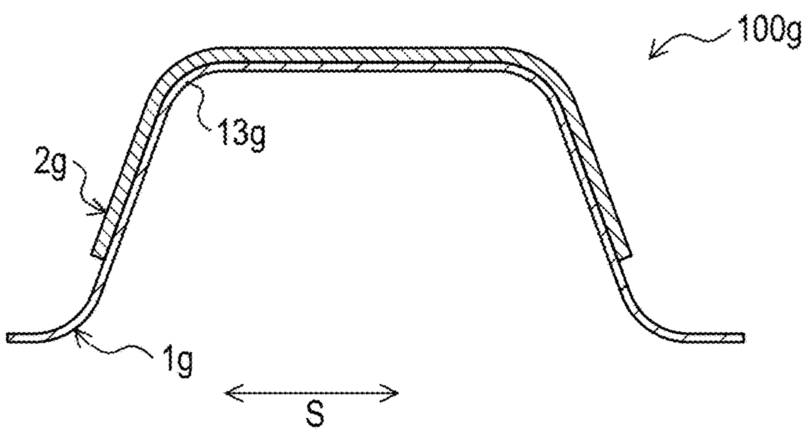
FIG. 13 is a schematic cross-sectional view of a formed product of an eighth modified example taken along a lateral direction of the formed product.

Moreover, for example, as a formed product 100*g* of the eighth modified example illustrated in FIG. 13, a cross-sectional shape of a second metal plate 2*g* may be a U-shape, in which the second metal plate 2*g* is placed on outer surfaces of two bent portions 13*g* of a first metal plate 1*g* having a cross-sectional shape of a hat shape.

(4d) In the aforementioned embodiment, the tensile strength of the second metal plate 2 is greater than that of the first metal plate 1, and the plate thickness of the second metal plate 2 is thinner than that of the first metal plate 1. This enables spring back of the second metal plate 2 to be larger than spring back of first metal plate 1. However, in order to make spring back of the second metal plate 2 larger than spring back of the first metal plate 1, the tensile strength and the plate thickness of each of the metal plates may be configured as follows. For example, in a case where the tensile strength of the second metal plate 2 is greater than that of the first metal plate 1, the plate thickness of the second metal plate 2 may be thicker than that of the first metal plate 1 or may be the same as that of the first metal plate 1. That is, only the fact that the tensile strength of the second metal plate 2 is greater than that of the first metal plate 1 may contribute to make spring back of the second metal plate 2 larger than spring back of first metal plate 1. Moreover, for example, in a case where the plate thickness of the second metal plate 2 is thinner than that of the first metal plate 1, the tensile strength of the second metal plate 2 may be smaller than that of the first metal plate 1 or may be the same as that of the first metal plate 1. That is, only the fact that the plate thickness of the second metal plate 2 is thinner than that of the first metal plate 1 may contribute to make spring back of the second metal plate 2 larger than spring back of first metal plate 1.

It should be noted that, in the configurations illustrated in FIGS. 12 and 13 in which the second metal plate is placed on an outer side of at least one of the two bent portions of the first metal plate, in order to make spring back of the first metal plates 1*f* and 1*g* larger than spring back of the second metal plates 2*f* and 2*g* respectively, the tensile strength and the plate thickness of each of the metal plates may be configured as follows. For example, the tensile strength of the first metal plates 1*f* and 1*g* may be greater than that of the second metal plates 2*f* and 2*g* respectively, and the plate thickness of the first metal plates 1*f* and 1*g* may be thinner than that of the second metal plates 2*f* and 2*g* respectively. Moreover, for example, in a case where the tensile strength of the first metal plates 1*f* and 1*g* is greater than that of the second metal plates 2*f* and 2*g* respectively, the plate thickness of the first metal plates 1*f* and 1*g* may be thicker than that of the second metal plates 2*f* and 2*g* respectively or may be the same as that of the second metal plates 2*f* and 2*g* respectively. Furthermore, for example, in a case where the plate thickness of the first metal plates 1*f* and 1*g* is thinner than that of the second metal plates 2*f* and 2*g* respectively, the tensile strength of the first metal plates 1*f* and 1*g* may be smaller than that of the second metal plates 2*f* and 2*g* respectively or may be the same as that of the second metal plates 2*f* and 2*g*. It should be noted that the first metal plates 1*f* and 1*g* are preferably formed from a high tensile strength steel having a tensile strength of 590 MPa or greater, and are more preferably formed from a high tensile strength steel having a tensile strength of 980 MPa or greater.

(4a) Functions of one element in the aforementioned embodiments may be achieved by two or more elements, or functions of two or more elements may be integrated into one element. A part of the configurations in the aforementioned embodiments may be omitted. At least a part of the configurations in the aforementioned embodiments may be added to or replaced with other part of the configurations in the aforementioned embodiments.

5. Technical Ideas Disclosed in Present Disclosure

[Item 1]

A method of manufacturing a formed product, the method comprising:

placing and welding an inner metal plate on an outer metal plate to form at least one first joining portion; and bending the outer metal plate with the inner metal plate by pressing after the at least one first joining portion is formed, wherein the pressing includes forming a first surface, at least one second surface, and at least one bent portion in the outer metal plate, wherein the at least one second surface extends in a direction that crosses the first surface, wherein the at least one bent portion couples the first surface and the at least one second surface to each other, and is layered on the inner metal plate, wherein the at least one first joining portion is a portion where the inner metal plate is welded on a region of the outer metal plate that is to become the first surface, wherein the inner metal plate is disposed on an inner side of the at least one bent portion, and wherein spring back of the inner metal plate is greater than spring back of the outer metal plate.

[Item 2]

The method of manufacturing a formed product according to Item 1, wherein tensile strength of the inner metal plate is larger than tensile strength of the outer metal plate.

[Item 3]

The method of manufacturing a formed product according to Item 1 or 2, wherein plate thickness of the inner metal plate is thinner than plate thickness of the outer metal plate.

[Item 4]

The method of manufacturing a formed product according to any one of Items 1 to 3, the method further comprising:

welding the outer metal plate and the inner metal plate together after the pressing to form at least one second joining portion, wherein the at least one second joining portion is a portion where the inner metal plate is welded on the at least one second surface.

[Item 5]

The method of manufacturing a formed product according to any one of Items 1 to 4, wherein a cross-cross sectional shape of the formed product taken along a direction in which the first surface, the at least one bent portion, and the at least one second surface are aligned is a hat shape, a U-shape, or an L-shape, and wherein the inner metal plate is formed from a high tensile strength steel having a tensile strength of 590 MPa or greater.

What is claimed is:

1. A method of manufacturing a formed product, the method comprising:

placing and welding an inner metal plate on an outer metal plate to form at least one first joining portion;

bending the outer metal plate with the inner metal plate by pressing after the at least one first joining portion is formed; and forming at least one second joining portion, wherein the pressing includes forming a first surface, at least one second surface, and at least one bent portion in the outer metal plate, wherein the at least one second surface extends in a direction that crosses the first surface, wherein the at least one bent portion couples the first surface and the at least one second surface to each other, and is layered on the inner metal plate, wherein the forming of the at least one second joining portion includes welding the outer metal plate and the inner metal plate together after the pressing to form the at least one second joining portion, the at least one second joining portion being three or more portions where the inner metal plate is welded on the at least one second surface, and the at least one second joining portion being arranged so as to be aligned spaced apart from each other along the at least one bent portion, wherein the at least one first joining portion is a portion where the inner metal plate is welded on a region of the outer metal plate that is to become the first surface, wherein the inner metal plate is disposed on an inner side of the at least one bent portion, and wherein spring back of the inner metal plate is greater than spring back of the outer metal plate.

2. The method of manufacturing a formed product according to claim 1, wherein tensile strength of the inner metal plate is larger than tensile strength of the outer metal plate.

3. The method of manufacturing a formed product according to claim 1, wherein plate thickness of the inner metal plate is thinner than plate thickness of the outer metal plate.

4. The method of manufacturing a formed product according to claim 1, wherein a projection is formed in the first surface of the outer metal plate of the formed product, the projection projecting in a plate thickness direction of the outer metal plate together with the inner metal plate.

5. The method of manufacturing a formed product according to claim 1, wherein a cross-cross sectional shape of the formed product taken along a direction in which the first surface, the at least one bent portion, and the at least one second surface are aligned is a hat shape, a U-shape, or an L-shape, and wherein the inner metal plate is formed from a high tensile strength steel having a tensile strength of 590 MPa or greater.

* * * * *